United States Patent Office.

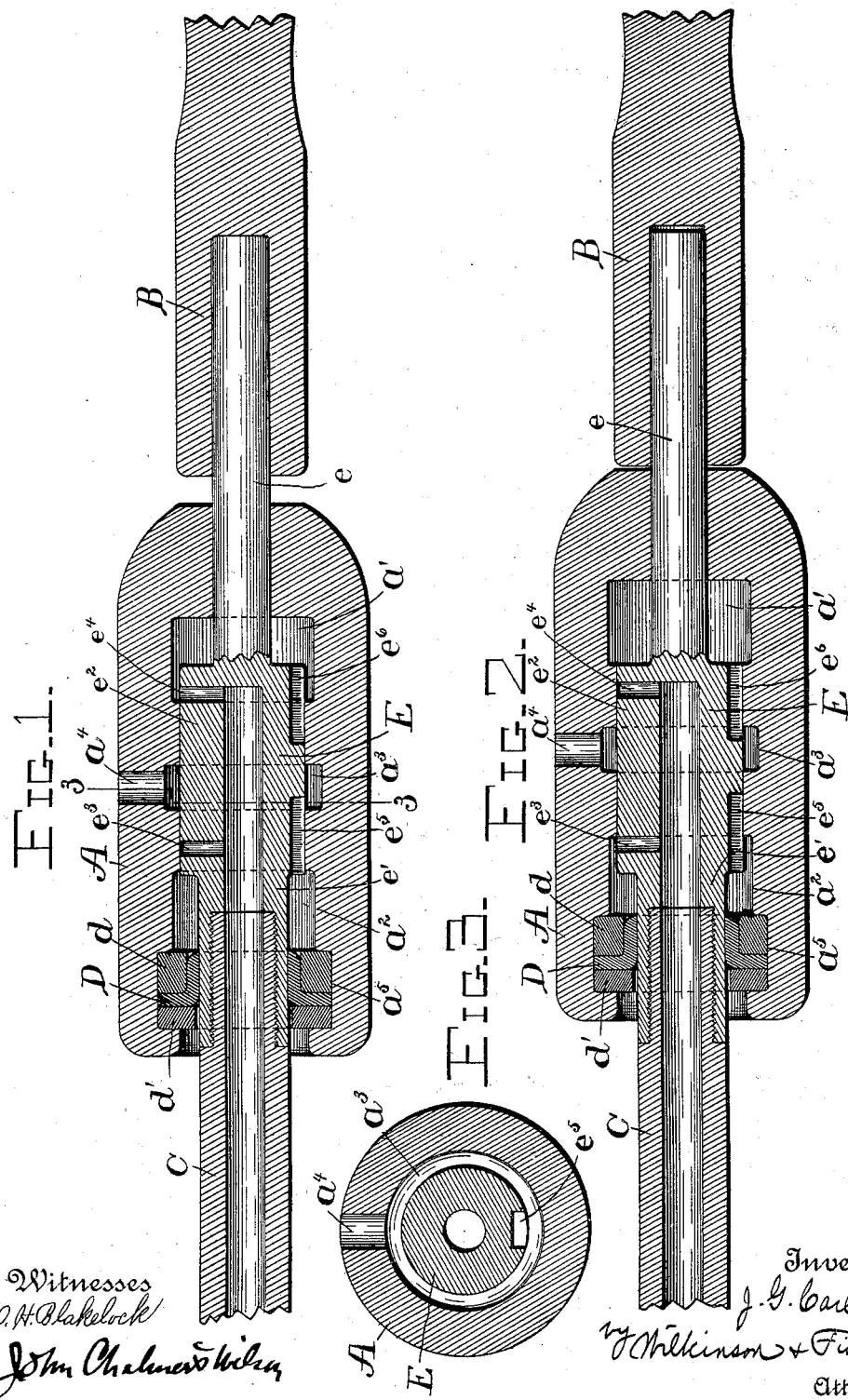

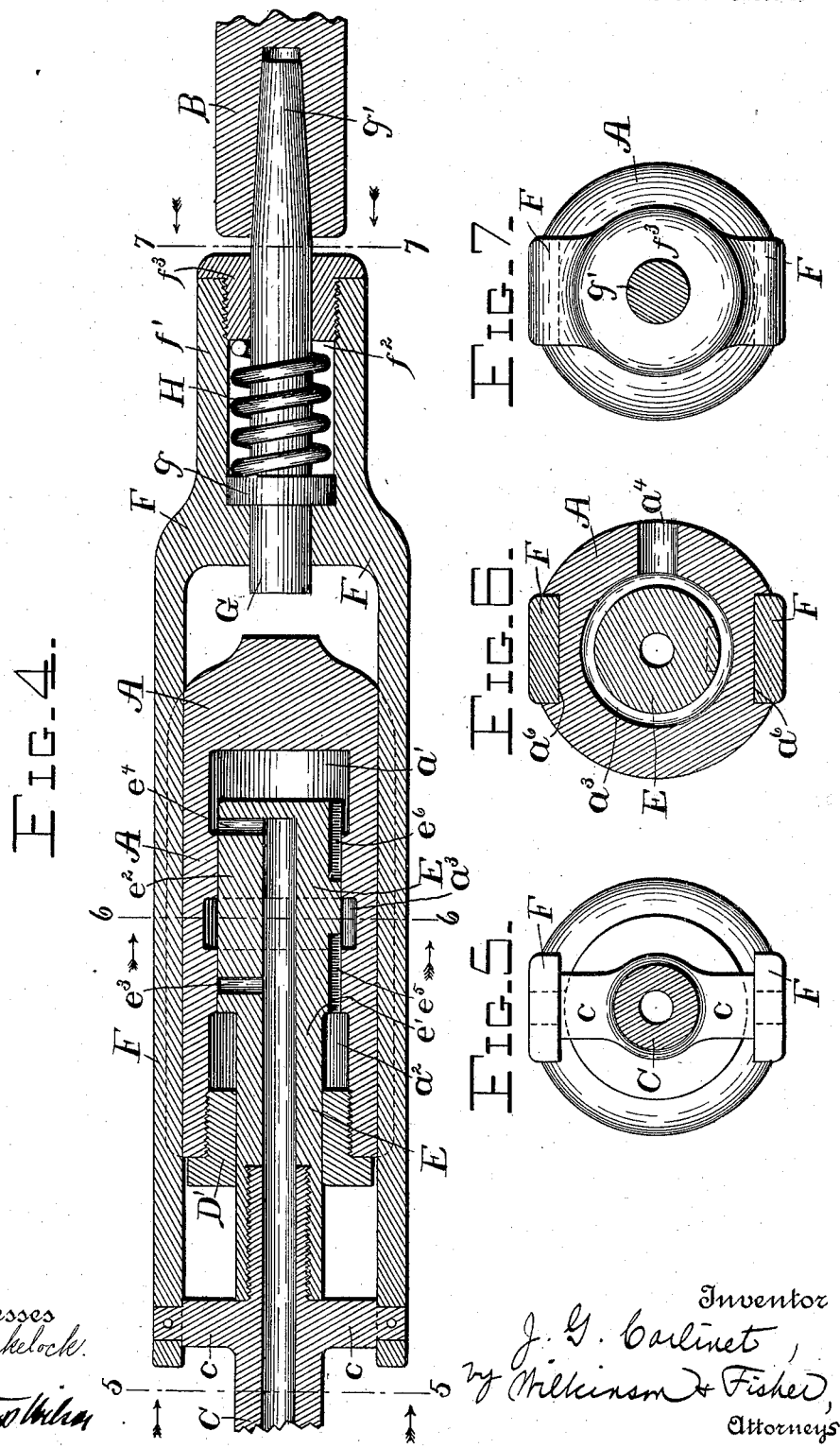

JOHN G. CARLINET, OF PHILADELPHIA, PENNSYLVANIA.

PNEUMATIC TOOL.

SPECIFICATION forming part of Letters Patent No. 608,953, dated August 9, 1898.

Application filed February 24, 1898. Serial No. 671,527. (No model.)

*To all whom it may concern:*

Be it known that I, JOHN G. CARLINET, a citizen of the United States, residing at Philadelphia, in the county of Philadelphia and State of Pennsylvania, have invented certain new and useful Improvements in Pneumatic Tools; and I do hereby declare the following to be a full, clear, and exact description of the invention, such as will enable others skilled in the art to which it appertains to make and use the same.

My invention relates to improvements in pneumatic tools for cutting stone, metal, or other substances; and the objects of the invention are to provide a simple, cheap, durable, and easily - operated tool of this class adapted to be operated by compressed-air or other fluid pressure in such a manner as to give a sharp quick blow to the chisel or cutting-tool, while imparting the least possible jar to the hand of the operator.

With these objects in view the invention consists in the construction and combination of parts, as hereinafter described and claimed.

In the accompanying drawings, Figure 1 is a longitudinal vertical section of my improved pneumatic tool ready to deliver a blow. Fig. 2 is a similar view of the same at the time the blow is struck. Fig. 3 is a cross-section on the line 3 3 of Fig. 1. Fig. 4 is a longitudinal vertical section of a modified form; and Figs. 5, 6, and 7 are cross-sections on the lines 5 5, 6 6, and 7 7, looking in the direction of the arrows.

Referring to Figs. 1 to 3, A is a casing adapted to reciprocate upon the central stem E. This casing therefore acts as a hammer. The walls of the casing are quite thick to give weight and make the blows given by it more effective. The front end of the casing is rounded down and entirely closed except for a perforation for the passage of the extension $e$ of the stem E, which extension fits into a hole in the chisel B. The casing A is hollowed out for its whole length except at the front.

The general shape of the opening is cylindrical and of a size to fit the largest part of the stem E; but near the front end there is an enlarged chamber $a'$ and a similar chamber $a^2$ near the other end. At the center there is a third enlarged chamber $a^3$, which I term the "exhaust-chamber," with which communicates an exhaust-port $a^4$. There is another enlarged chamber $a^5$ near the rear end of the casing, which is open.

A packing D, preferably of leather, is located in the chamber $a^5$, right-angled in cross-section, and is held in place by rings or washers $d$ $d'$, preferably of leather.

The supporting-stem E is not of uniform size. The rear part $e'$ is hollow and is connected to the hollow handle C, which in turn is connected to the hose. Next to the part $e'$ is the part $e^2$, which is the largest part of the stem and which is hollow and provided with the radial ports $e^3$ $e^4$ and the longitudinal ports $e^5$ $e^6$. The part $e$ is the smallest part of the stem and is connected to the cutting-tool.

The operation is as follows: Air or other operating fluid is admitted through the handle C, the device being in the position shown in Fig. 1. The air passes through the port $e^4$ into the chamber $a'$, forcing the casing A forward, giving a quick sharp blow to the cutter B, the port $e^3$ being closed and the port $e^5$ connecting with the outer air through the chamber $a^3$ and port $a^4$. The forward movement continues until the device is in the position shown in Fig. 2, at which time the port $e^4$ is closed and the port $e^6$ opened. Moreover, the port $e^3$ is then in communication with the chamber $a^2$ and the port $e^5$ is closed. The air rushes into the chamber $a^2$ and drives the casing A back to its original position. The cycle of movements is then repeated.

Each of the chambers $a'$ $a^2$ provides an air-cushion, which reduces the shock to the operator to a minimum. In fact, with a tool of the ordinary size the shock is scarcely noticeable.

In Figs. 4 to 7 a modified form of my device is shown. The casing A, instead of being wholly supported on the stem E, is chiefly supported by the frame F, which engages oppositely-arranged parallel slots $a^6$, cut in the interior of the casing. In this form the front end of the casing is not perforated and the rear end is closed by a nut D' and the extension $e$ of the stem E is dispensed with. In this form the handle C is provided with extensions which are connected to the frame F. This frame has an extension $f'$, which is hollowed out at $f^2$ and closed by a perforated nut $f^3$. In this extension is mounted the anvil G, provided with an enlargement $g$ of a size to fit in the hole $f^2$. A spiral spring H is confined between the enlargement $g$ and nut $f^3$ and serves to return the anvil to place after each blow. The spindle of the anvil is made conical at $g'$ to engage a similarly-shaped opening in the chisel B. The other parts are similar to those described in connection with the form shown in Figs. 1 to 3.

It is obvious that many changes might be made without departing from the spirit of the invention, and I wish it to be expressly understood that I do not limit myself to the exact construction shown.

Having thus described my invention, what I claim as new, and desire to secure by Letters Patent of the United States, is—

1. In a pneumatic tool, the combination of a cutter, a stem connected to said cutter, a reciprocating casing which acts as a hammer supported on said stem, said casing being provided with enlarged chambers and an exhaust-port, and said stem having a hollow extending for a part of its length through it and ports, substantially as described.

2. In a pneumatic tool, the combination of a hollow handle, a stem with an enlarged hollow central portion and provided with ports, a cutter secured to said stem, and a casing mounted on said stem and adapted to reciprocate thereon and to act as a hammer, substantially as described.

3. In a pneumatic tool, the combination of a hollow handle, a stem provided with an enlarged hollow central portion and with a plurality of inlet and exhaust ports, a cutter secured to said stem, a reciprocating casing mounted on said stem and acting as a hammer, said casing being provided with enlarged chambers into which the motive fluid is delivered to actuate the casing, and an enlarged exhaust-chamber provided with a port and means for closing the rear end of the chamber, substantially as described.

4. In a pneumatic tool, the combination of a hollow handle, a stem hollow for a part of its length and having a hollow central enlarged portion provided with two inlet-ports and two outlet-ports, a cutter secured to said stem, a reciprocating casing mounted on said stem and acting as a hammer, said casing being provided with four enlarged chambers, one for the reception of packing, two for the reception of the motive fluid located near the ends of said casing and one centrally-located exhaust-chamber, provided with an exhaust-port, and packing in one of said chambers, substantially as described.

5. In a pneumatic tool, the combination with a hollow supporting-stem provided with an enlarged portion in which are located inlet and outlet ports; of a casing of a cylindrical form hollowed out the greater portion of its length and provided with a plurality of interior enlarged chambers and an exhaust-port; the said casing inclosing the enlarged portion of said stem and arranged to reciprocate thereon, and to act as a hammer; and a tool-holder for holding the tool while being operated upon by said casing, substantially as described.

6. In a pneumatic tool, the combination with a supporting-stem hollow for a portion of its length and provided with a hollow enlarged portion in which are located ports arranged radially and axially thereof; of a cylindrical casing hollowed out the greater portion of its length leaving a thickened portion at its forward end, and provided with a plurality of enlarged interior chambers and a central exhaust-port; the said casing inclosing the enlarged portion of said stem and arranged to reciprocate thereon and to act as a hammer; and a tool-holder, substantially as described.

In testimony whereof I affix my signature in presence of two witnesses.

JOHN G. CARLINET.

Witnesses:
ALLAN J. CASSIDY,
CHARLES E. LEVER.